United States Patent
Qian et al.

(10) Patent No.: US 10,628,602 B2
(45) Date of Patent: Apr. 21, 2020

(54) CONTROLLING CONTENT MODIFICATIONS BY ENFORCING ONE OR MORE CONSTRAINT LINKS

(71) Applicant: QUEST SOFTWARE INC., Aliso Viejo, CA (US)

(72) Inventors: Lin Jun Qian, Guangdong (CN); Ah Kioon Mary Cindy, Guangdong (CN); Guoxiong Wu, Guangdong (CN)

(73) Assignee: QUEST SOFTWARE INC., Aliso Viejo, CA (US)

( * ) Notice: Subject to any disclaimer, the term of this patent is extended or adjusted under 35 U.S.C. 154(b) by 326 days.

(21) Appl. No.: 14/981,299

(22) Filed: Dec. 28, 2015

(65) Prior Publication Data
US 2017/0185798 A1    Jun. 29, 2017

(51) Int. Cl.
G06F 17/30 (2006.01)
G06F 21/62 (2013.01)
G06F 16/23 (2019.01)

(52) U.S. Cl.
CPC ...... *G06F 21/6227* (2013.01); *G06F 16/2358* (2019.01)

(58) Field of Classification Search
CPC .................. G06F 16/2358; G06F 21/6227
See application file for complete search history.

(56) References Cited

U.S. PATENT DOCUMENTS

| | | | | |
|---|---|---|---|---|
| 8,042,186 | B1 * | 10/2011 | Polyakov | G06F 21/564 726/24 |
| 9,251,114 | B1 * | 2/2016 | Ancin | G06F 15/17331 |
| 9,871,778 | B1 * | 1/2018 | Taralika | H04L 63/08 |
| 2005/0076245 | A1 * | 4/2005 | Graham | G06F 21/552 726/4 |
| 2007/0220068 | A1 * | 9/2007 | Thompson | G06F 21/6218 |
| 2008/0162483 | A1 * | 7/2008 | Becker | G06F 17/30575 |
| 2011/0078197 | A1 * | 3/2011 | Zurko | G06F 17/30165 707/783 |
| 2011/0225373 | A1 * | 9/2011 | Ito | G06F 12/0815 711/145 |
| 2011/0270886 | A1 * | 11/2011 | An | G06F 17/3007 707/785 |

(Continued)

OTHER PUBLICATIONS

The DLP (http://www.hisoftware.com/solutions/by-need/sharepoint-dlp.aspx) (4pgs).

*Primary Examiner* — Alicia M Willoughby
(74) *Attorney, Agent, or Firm* — Maschoff Brennan

(57) ABSTRACT

Embodiments of the present disclosure include systems and methods for controlling modification of a data file that is accessed by multiple components of an application platform. The method for controlling modification of a data file includes: preparing a link constraint data that includes information of a data file and a component of an application platform, the component being associated with the data file; preparing an alert data that includes information of the data file and a person having a permission to modify the data file; responsive to an attempt of a user to modify the data file, retrieving the information of the component from the link constraint data and the information of the person from the alert data; and sending a notice of the attempt to at least one of the person and the user.

12 Claims, 6 Drawing Sheets

(56) References Cited

U.S. PATENT DOCUMENTS

| | | | | |
|---|---|---|---|---|
| 2011/0321135 | A1* | 12/2011 | Dickerson | G06F 21/6218 726/4 |
| 2012/0266239 | A1* | 10/2012 | Bradley, II | G06F 21/6218 726/21 |
| 2012/0317645 | A1* | 12/2012 | Fortier | G06F 21/562 726/24 |
| 2013/0019320 | A1* | 1/2013 | Ericsson | G06F 21/62 726/28 |
| 2013/0226872 | A1* | 8/2013 | Barefoot | G06F 16/27 707/638 |
| 2013/0246470 | A1* | 9/2013 | Price | G06F 21/6218 707/783 |
| 2014/0297751 | A1* | 10/2014 | Antani | G06F 9/468 709/204 |
| 2015/0178483 | A1* | 6/2015 | Kerber | G06F 8/65 726/30 |
| 2016/0180087 | A1* | 6/2016 | Edwards | G06F 21/566 726/24 |

* cited by examiner

| Employee Name | Department | Age | Sale | ... |
|---|---|---|---|---|
| John Doe | HR | 30 | 0 | ... |
| Jane Smith | Sales | 29 | $100K | ... |
| Mary Doe | Accounting | 25 | 0 | ... |
| ⋮ | ⋮ | ⋮ | ⋮ | ⋮ |

FIG. 1 (PRIOR ART)

CONTROLLING CONTENT MODIFICATIONS BY ENFORCING ONE OR MORE CONSTRAINT LINKS

A. TECHNICAL FIELD

The present invention relates to management of data for an application platform, more particularly, to systems and methods for controlling modifications of data that is accessed by multiple components of an application platform.

B. DESCRIPTION OF THE RELATED ART

SharePoint® software (hereinafter, "SP") is a popular web application platform that organizations use for intranet sites as well as for internal and external collaboration. SP includes SharePoint Lists® (hereinafter, "SP lists") and SharePoint Consumers® software (hereinafter, "SP consumers" or "SP components"). SP lists are used to manage information and contain data of various types, such as, contracts, discussion board, calendar, sales, tasks or custom. For example, FIG. 1 shows a SP list 100 that contains the information of sales by employees. The Sales list 100 may have multiple fields (i.e., columns), such as employee name 102a, department 102b, age 102c, and amounts of sale 102d made by the employees.

Each SP list may be access by one or more SP components, where each SP component is a toolkit and has various functions, such as providing the SP users with data retrieved from the SP lists. For instance, Web Parts® software, which are the building blocks of pages that appear on a SharePoint, are SP components and may access the Sales list 100 and display the amounts of sales made by the employees in the sales department. In another example, SharePoint Workflows® software, which are SP components and pre-programmed mini-applications that streamline and automate a wide variety of business processes—from collecting signatures, feedback, or approvals for a plan or document, to tracking the current status of a routine procedure, may access the Sales list 100.

It is not uncommon that SP lists need some changes/updates. For instance, the amounts in the Sale 102d may be updated on a regular basis. Such a change in the contents may not affect the operation of other SP components. However, if a user changes the name of the field 102d, such as "Sale" into "Total Sales," without knowing that the Sales list 100 is accessed by multiple SP components, the result may be that all of the SP components that access the Sale field 102d would not work as expected. Even the users who have proper permission to change the Sales list 100 may modify the SP list without knowing how many SP components are currently using the SP list or they may think that the change is not harmful since they have permission. When a user makes improper changes to the SP list, some of the SP sites may crash, bringing negative impacts to other end users. This can not only cause a decrease in productivity, but also being a very bad reputation to the affected company.

Preventing harmful changes to the SP lists becomes a very challenging task as it is common that there are multiple persons, such as SP list creator and SP site owner, who have permission to change the SP lists. Typically, SP gives permission control to the SP list creator or SP site owner, and restricts other users from modifying the SP list. However, the SP list owner/site owner may not know which fields of the SP list are currently being used by SP components. As such, it becomes very difficult to manually add permission control, making safe changes to SP lists become unnecessarily complicated. Thus, there is a need for efficient systems and methods for automatically controlling modification of SP lists that are accessed by multiple SP components.

BRIEF DESCRIPTION OF THE DRAWINGS

References will be made to embodiments of the present disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 1 shows an exemplary conventional SP list.

DETAILED DESCRIPTION OF THE PREFERRED EMBODIMENTS

Figure 2A:
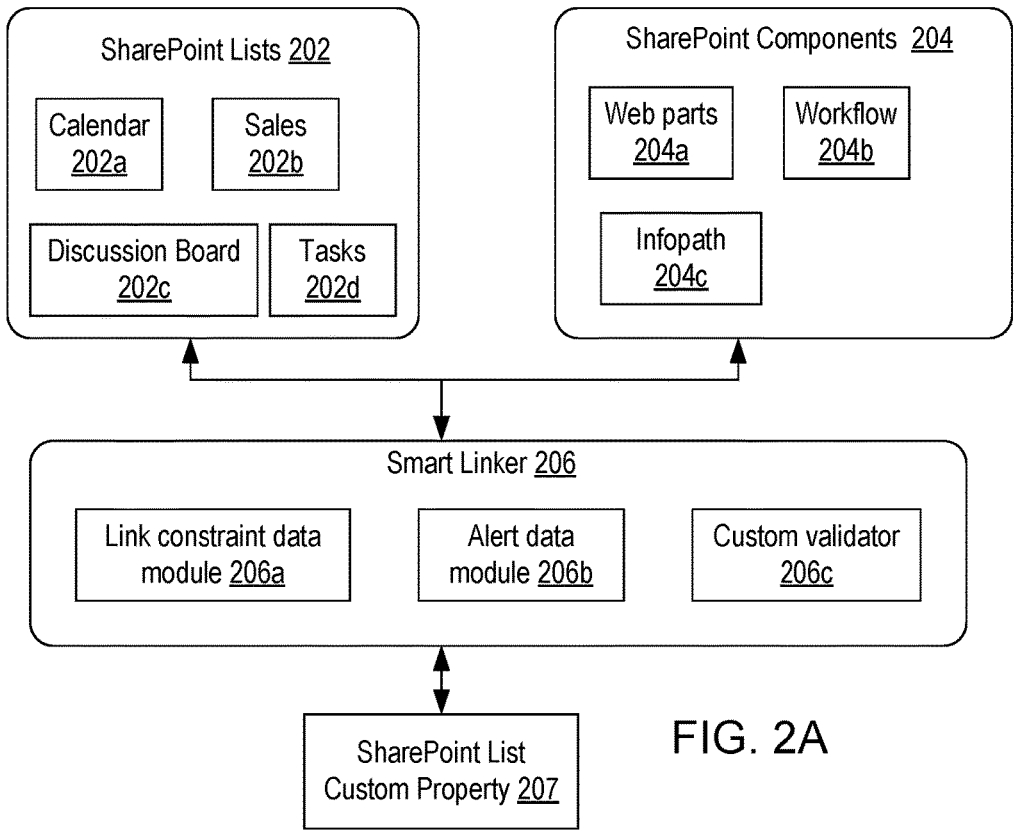
FIG. 2A shows a functional diagram of various elements in a SP farm according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Elements/components shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components/elements. Components/elements may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize that: (1) certain steps may optionally be performed; (2) steps may not be limited to the specific order set forth herein; and (3) certain steps may be performed in different orders; and (4) certain steps may be done concurrently.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," or "in embodiments" in various places in the specification are not necessarily all referring to the same embodiment or embodiments. The terms "include," "including," "comprise," and "comprising" shall be understood to be open terms and any lists that follow are examples and not meant to be limited to the listed items. Any headings used herein are for organizational purposes only and shall not be used to limit the scope of the description or the claims.

Furthermore, the use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Embodiments described herein use SP as an example; however, it shall be noted that the current disclosure is not limited to use only with SP. Rather, aspects of the present disclosure may be used in other situations and with other applications in which a plurality of people can access a common set of data.

FIG. 2A shows a functional diagram of various elements in a SP farm 200 according to embodiments of the present disclosure. Here, the term SP farm refers to a collection of hardwares/softwares that together make up a SharePoint platform, i.e., SP farm collectively refers to elements in the topological space of a web application platform. FIG. 2 shows only four components of a SP farm; SP lists 202, SP components 204, a smart linker 206, and SharePoint list custom property 207. However, it should be apparent to those of ordinary skill in the art that the SP farm 200 may include other suitable number of web front-end servers, databases coupled to the front-end servers and software programs running on the servers.

In embodiments, the smart linker 206 is coupled to the SP lists 202, SP components 204, and SP list custom property 207. SP lists 202 are used to manage information and contain data of various types. In FIG. 2A, only four SP lists (i.e., calendar 202a, Sales 202b, discussion board 202c, and tasks 202d) are shown for brevity. However, it should be apparent to those of ordinary skill in the art that other suitable types of lists can be included in the SP lists 202. The SP lists 202 may be accessed by one or more SP components 204, where each SP component may be a toolkit that a user may drag into an SP page and provides the SP users with data retrieved from the SP lists 202. In FIG. 2A, only three SP components (i.e., web parts 204a, workflow 204b and infopath 204c) are shown, even though other suitable types of components (consumers) can be included in the SP components 204.

Figure 2B:
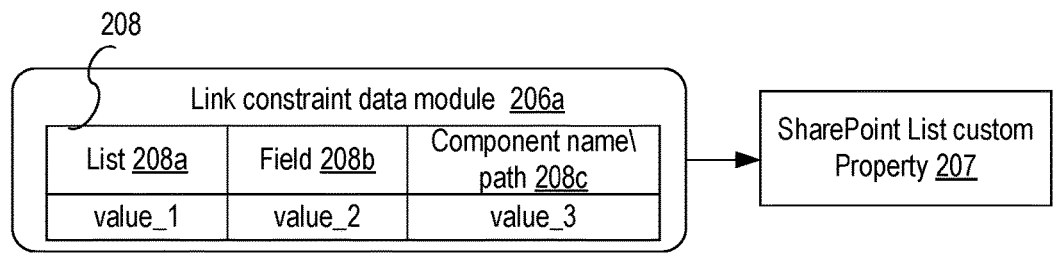
FIG. 2B shows a structure of an exemplary link constraint data generated by a link constraint data module according to embodiments of the present disclosure.

As depicted in FIG. 2A, the smart linker 206 includes a link constraint data module 206a. FIG. 2B shows a structure of an exemplary link constraint data 208 generated by a link constraint data module 206a according to embodiments of the present disclosure. As depicted, the link constraint data module 206a generates and stores the link constraint data 208 into the SharePoint list custom property 207.

Figure 3A:
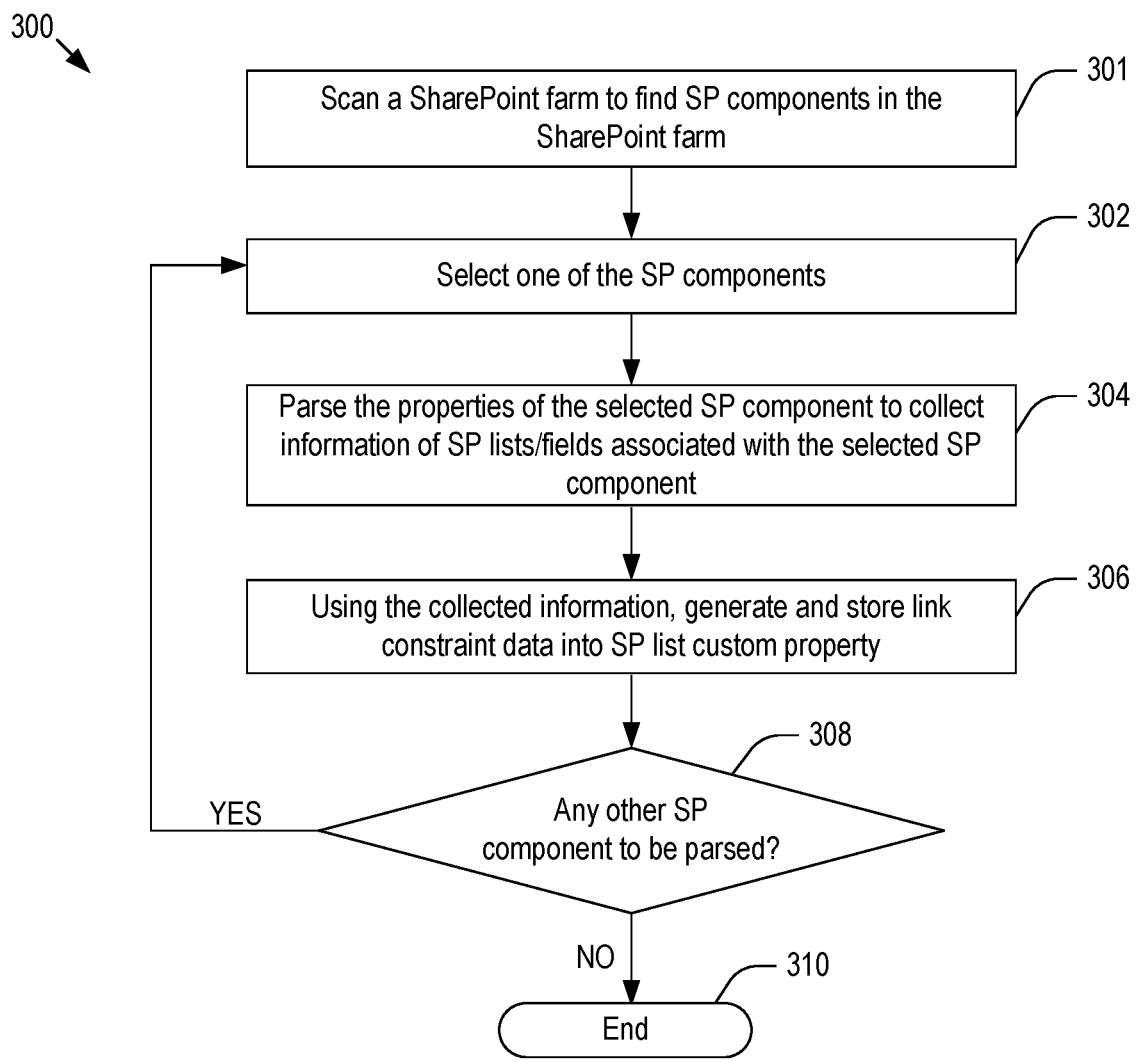
FIG. 3A shows a flowchart of an illustrative process for generating link constraint data according to embodiments of the present disclosure.

FIG. 3A shows a flowchart 300 of an illustrative process for generating link constraints between SP lists 202 and SP components 204 according to embodiments of the present disclosure. At step 301, the link constraint data module 206a scans a SP farm to find the SP components includes in the SP farm. In one embodiment, the link constraint data module 206a may scan the entire portion of the SP farm. In another embodiments, the link constraint data module 206a may scan a portion of the SP farm, more specifically, the SP site collections of a web application supported by the SP farm. Hereinafter, the term SP farm refers to a fraction of or the entire portion of the SP farm that the smart link 206 is allowed to scan.

At steps 302 and 304, the link constraint data module 206a selects one of the scanned SP components and parses the properties of the selected SP component to collect information of the SP lists and/or fields associated with the selected SP component. Then, using the collected information, the link constraint data module 206a generates link constraint data at step 306. As depicted in FIG. 2B, the link constraint data 208 may include information of an SP list 208a, a field 208b of the SP list and the name\path 208c of an SP component associated with the SP list and field. In embodiments, the Sales list 202b may have the same data structure as the Sales list 100 in FIG. 1 and the web part 204a may retrieve the data stored in the Sale field of the Sales list 202b. Also, in embodiments, the value_1 may have the format of the URL_of_list # name_of_list, the value_2 may be the name of the field, and the value_3 may have the format of URL_of_component # name_of_component # componentID. In those embodiments, the value_1 is a text string "URL_of_Sales # Sales" and the value_2 is a text string "Sale" and the value_3 is a text string that includes the URL of web part 204, the name of the web part, and the ID of the web part. Here, the terms URL and ID refer to uniform-resource-locator and identification, respectively.

At step 306, the link constraint data 208 is stored in a data storage, such as SharePoint list custom property 207. Then, at step 308, the link constraint data module 206a checks if there is any SP component to be parsed in the SP farm. If the answer to the step 308 is positive, the process proceeds to the step 302. Otherwise, the process ends at the step 310.

Figure 2C:
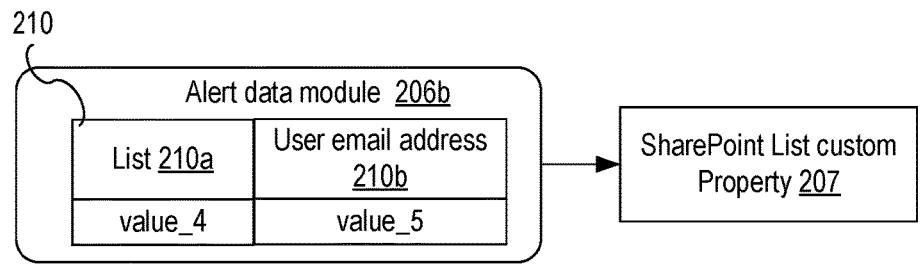
FIG. 2C shows a structure of an exemplary alert data generated by an alert data module according to embodiments of the present disclosure.
Figure 3B:
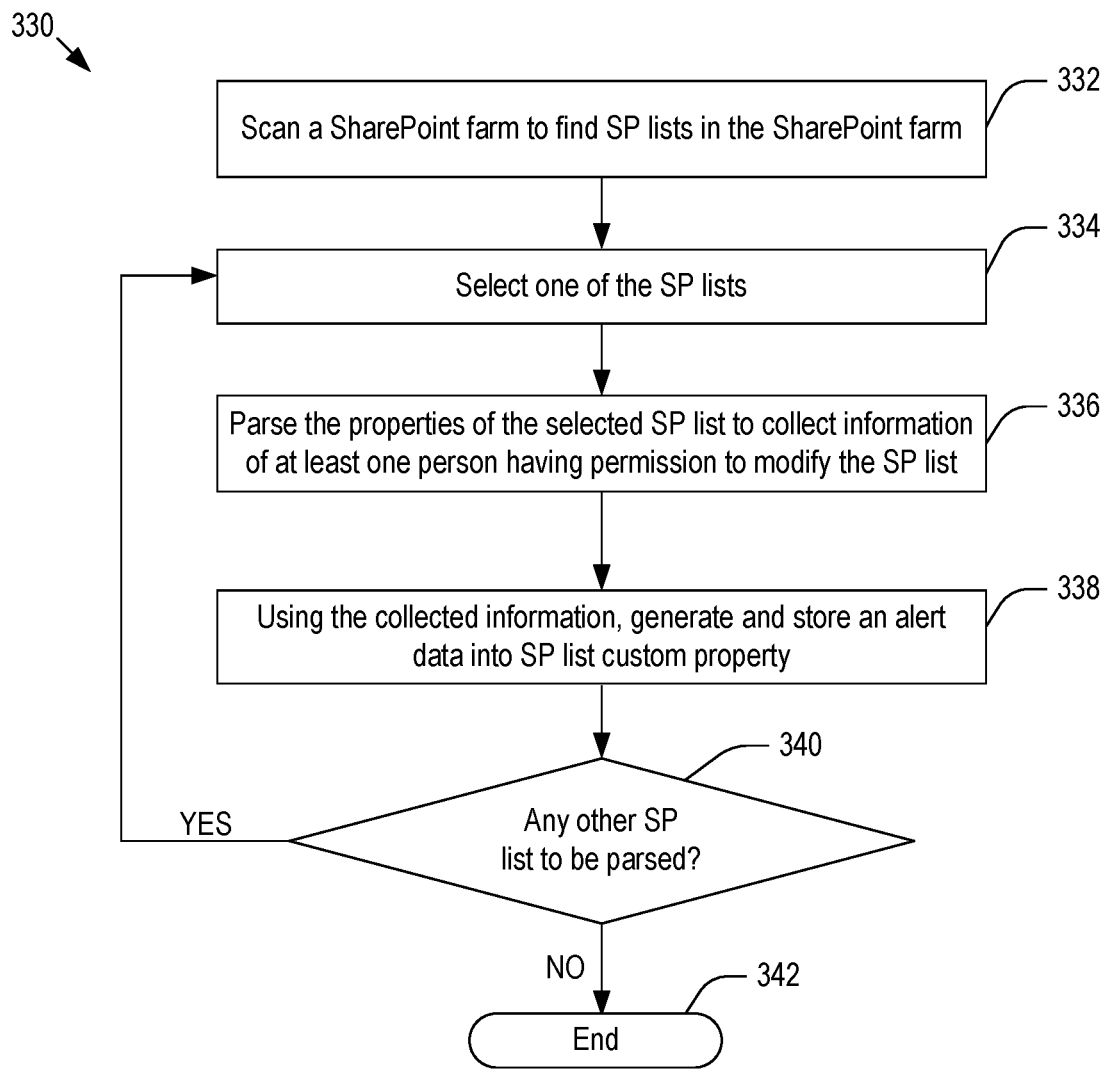
FIG. 3B shows a flowchart of an illustrative process for generating alert data according to embodiments of the present disclosure.

FIG. 2C shows a structure of an exemplary alert data 210 generated by an alert data module 206b according to embodiments of the present disclosure. FIG. 3B shows a flowchart 330 of an illustrative process for generating alert data 210 according to embodiments of the present disclosure. At step 332, the alert data module 206b scans a SP farm to find SP lists includes in the SP farm. At steps 334 and 336, the alert data module 206b selects one of the SP lists and parses the properties of the selected SP list to collect the information of at least one person who has permission to modify the SP list, such as the creator of the SP list or SP site owner. Also, the alert data module 206b accesses an authentication database, such as Active Directory® software, to get the contact information, such as email address, of the person. Then, at step 338, using the information of the person, the alert data module 206b generates alert data 210 and stores the alert data into a data storage, such as SP list custom property 207. In embodiments, the alert data has the structure as shown in FIG. 2C. In embodiments, the value_4 of the list 210a is similar to the value_1 in FIG. 2B, i.e., the value_4 is a text string that includes the URL of the SP list and name of the SP list while the value_5 includes the email address of the person who has the permission.

Then, at step 340, the alert data module 206b checks if there is any SP list to be parsed in the SP farm. If the answer to the step 340 is positive, the process proceeds to the step 334. Otherwise, the process ends at the step 342.

Figure 4:
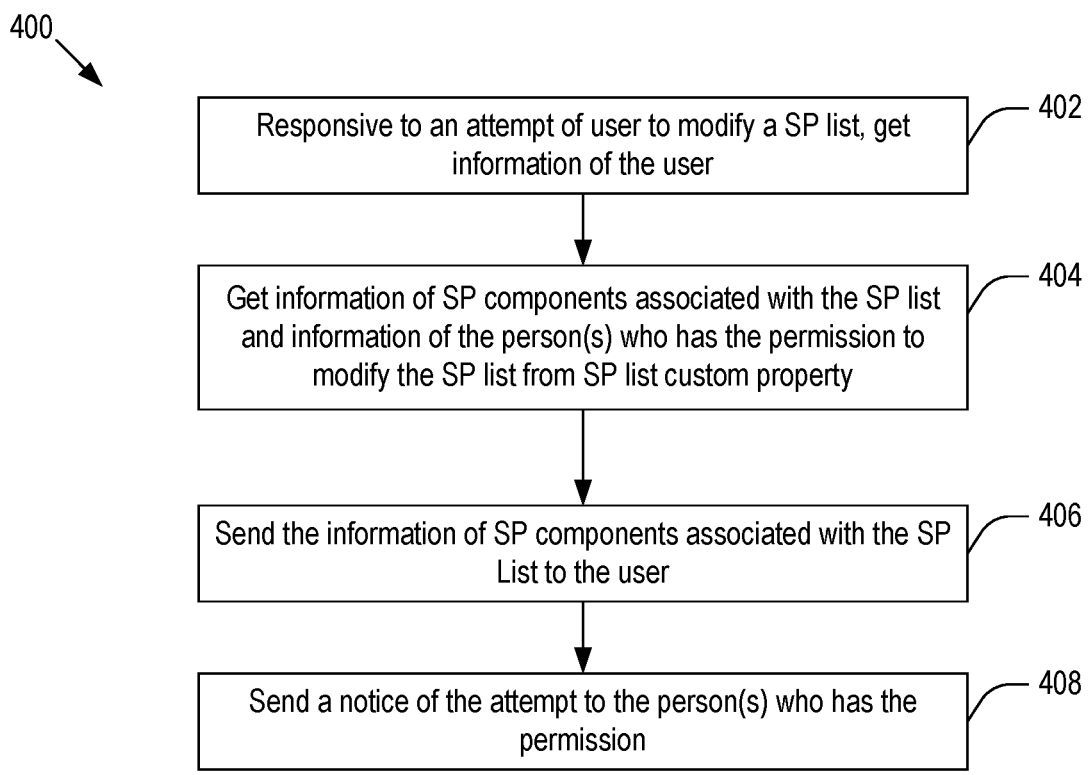
FIG. 4 shows a flowchart of an illustrative process for controlling modification of SP lists according to embodiments of the present disclosure.

FIG. 4 shows a flowchart 400 of an illustrative process for controlling modification of SP lists according to embodiments of the present disclosure. When a user attempts to modify a SP list, the custom validator 206c in FIG. 2A gets information of the user at step 402. Then, at step 404, the custom validator 206c gets the information of SP components associated with the SP list and information of the person(s) who has the permission to modify the SP list from a database, such as the SP list custom property 207. In embodiments, the custom validator 206c also gets the information of the list creator, the list owner, the site owner. Hereinafter, the term controllers collectively refer to one or more of a list creator, a list owner, a site owner, or others with permission to modify the SP list. Next, at step 406, the custom validator 206c sends the information of the SP components to the user so that the user is warned of the potential harm that his modification may cause to the SP components. In embodiments, at step 406, the custom validator 206c does not allow the user to modify the SP list, i.e., the custom validator 206c prevents the user from modifying the SP list. At step 408, the custom validator 206c sends a notice of the attempt to the controllers. In embodiments, the notice may include various warning signals, such as the information of the user, the type of attempt, the name of list/field, the list of SP components that may be affected by the modification, or any combination thereof. In embodiments, the process 400 is performed in real time.

It is noted that the smart linker 206 may be used in other suitable application platforms, such as Lotus Notes® software, that are similar to the SharePoint® software, i.e., the smart linker 206 may be used to prevent harmful modification of data files that are accessed by multiple consumers/components in the other application platforms. In the present document, the SP lists 202 and SP components 204 are used as exemplary data files/structures and multiple consumers that access the data files/structures, respectively. As such, the SP lists 202 and SP components 204 should be interpreted as data files/structures and one or more consumers that access the data files/structures in an application platform that provides the functions similar to SharePoint® software.

As discussed above, the smart linker 206 prevents potentially harmful modification of a SP list 202 by establishing a link constraint between the SP list and SP components 204 that access the SP list. When a user wants to modify, change, or delete an SP list, the smart linker 206 automatically sends alerts to persons with permission to modify the SP list (such as SP list creator and SP site owner) as well as the user so that they are warned of the potential harm of the attempt and take proper actions to prevent the attempt or assist the user to complete the modification in a safe manner.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present disclosure may be implemented in any instruction-execution/computing device or system capable of processing data, including, without limitation phones, laptop computers, desktop computers, and servers. The present disclosure may also be implemented into other computing devices and systems. Furthermore, aspects of the present disclosure may be implemented in a wide variety of ways including software (including firmware), hardware, or combinations thereof. For example, the functions to practice various aspects of the present disclosure may be performed by components that are implemented in a wide variety of ways including discrete logic components, one or more application specific integrated circuits (ASICs), and/or program-controlled processors. It shall be noted that the manner in which these items are implemented is not critical to the present disclosure.

Figure 5:
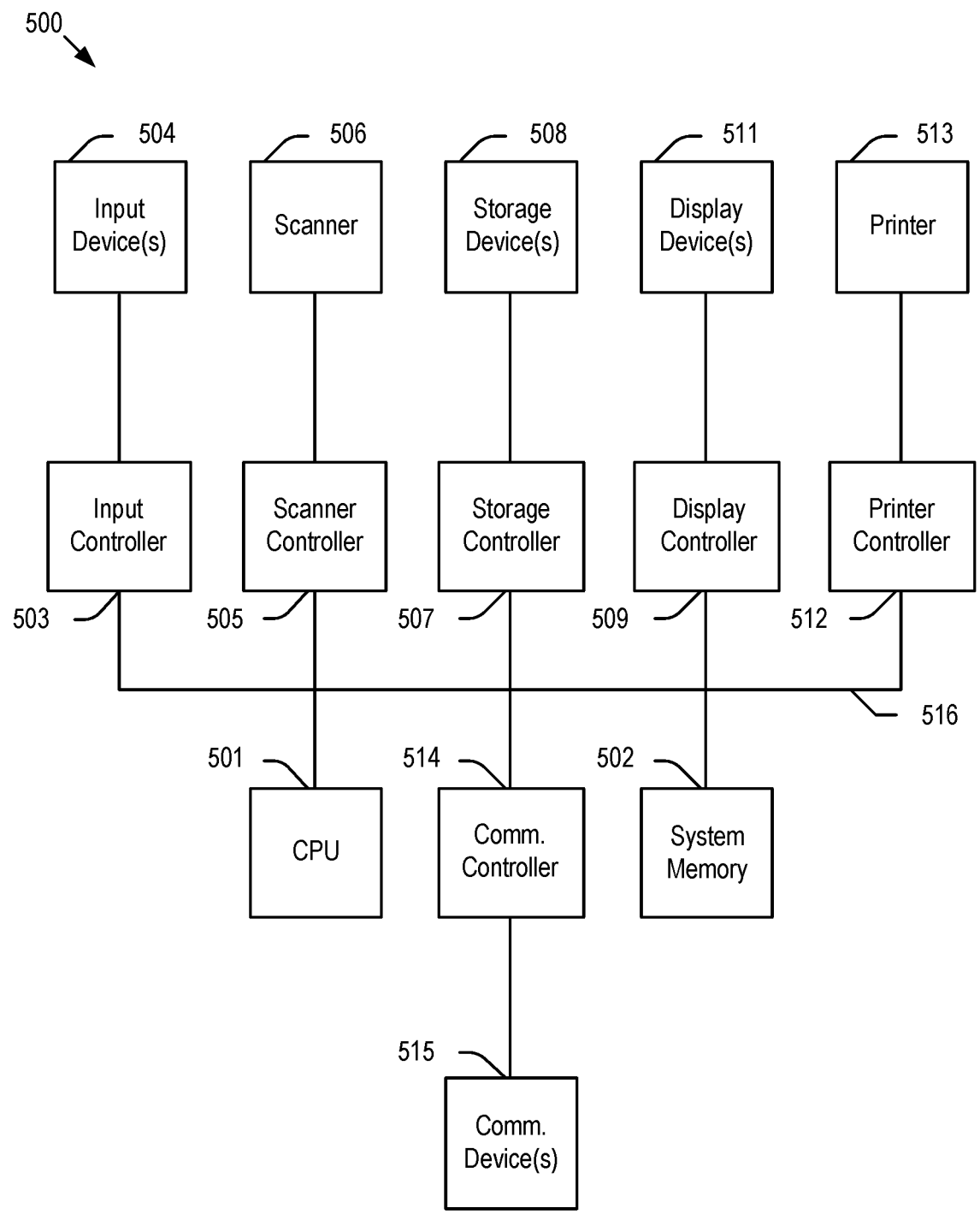
FIG. 5 shows a computer system according to embodiments of the present disclosure.

Having described the details of the disclosure, an exemplary system 500, which may be used to implement one or more aspects of the present disclosure, will now be described with reference to FIG. 5. Each client/server in FIG. 1 includes one or more components in the system 500. As illustrated in FIG. 5, system 500 includes a central processing unit (CPU) 501 that provides computing resources and controls the computer. CPU 501 may be implemented with a microprocessor or the like, and may also include a graphics processor and/or a floating point coprocessor for mathematical computations. System 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus. There may also be a scanner controller 505, which communicates with a scanner 506. System 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present disclosure. Storage device(s) 508 may also be used to store processed data or data to be processed in accordance with the disclosure. System 500 may also include a display controller 509 for providing an interface to a display device 511, which may be a cathode ray tube (CRT), a thin film transistor (TFT) display, or other type of display. System 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure.

What is claimed is:

1. A method, comprising:
   preparing a link constraint data that includes information of a data file and a component of an application platform, the component being configured to access the data file, wherein preparing the link constraint data comprises:
   scanning the application platform to find the component included in the application platform;
   parsing properties of the component to collect the information of the data file;
   generating the link constraint data using the information of the data file and component; and
   storing the link constraint data in a database;
   preparing and storing an alert data that includes information of the data file and controllers of the data file, wherein controllers have permission to modify the data file;
   responsive to an attempt of a user to modify the data file:
   retrieving the information of the component from the link constraint data and the information of the controllers from the alert data; and
   not allowing the user to modify the data file based on a determination that the component is configured to access the data file;
   sending a notice of the attempt to modify the data file to the controllers and the user, the notice including information of potential harm to other components, which are configured to access the data file, if a modification to the data file were allowed, wherein the notice includes a list of components that may be affected by the modification to the data file; and
   in response to receiving the notice, performing at least one of: preventing any further attempts from the user to modify the data file, or assisting the user in completing the modification in an allowed manner.

2. The method of claim 1, wherein the step of preparing an alert data comprises:
   scanning the application platform to find the data file included in the application platform;
   parsing properties of the data file to collect the information of the controllers;
   generating the alert data using the information of the data file and controllers; and
   storing the alert data in a database.

3. The method of claim 1, wherein the data file includes at least one field and the link constraint data includes a uniform resource location (URL) path of the data file, a name of the field, and a name of the component.

4. The method of claim 1, wherein the alert data includes a uniform resource location (URL) path of the data file and a contact information of the controllers.

5. A system, comprising:
   one or more processors; and
   a non-transitory computer-readable medium or media comprising one or more sequences of instructions which, when executed by the one or more processors, causes a system to perform operations comprising:
   preparing a link constraint data that includes information of a data file and a component of an application platform, the component being configured to access the data file, wherein preparing the link constraint data comprises:

scanning the application platform to find the component included in the application platform;
parsing properties of the component to collect the information of the data file;
generating the link constraint data using the information of the data file and component; and
storing the link constraint data in a database:
preparing and storing an alert data that includes information of the data file and controllers of the data file, wherein controllers have permission to modify the data file;
responsive to an attempt of a user to modify the data file:
retrieving the information of the component from the link constraint data and the information of the controllers from the alert data; and
not allowing the user to modify the data file based on a determination that the component is configured to access the data file;
sending a notice of the attempt to modify the data file to the controllers and the user, the notice including information of potential harm to other components, which are configured to access the data file, if a modification to the data file were allowed, wherein the notice includes a list of components that may be affected by the modification to the data file; and
in response to receiving the notice, performing at least one of: preventing any further attempts from the user to modify the data file, or assisting the user in completing the modification in an allowed manner.

6. The system of claim 5, wherein preparing the alert data comprises:
scanning the application platform to find the data file included in the application platform;
parsing properties of the data file to collect the information of the controllers;
generating the alert data using the information of the data file and controllers; and
storing the alert data in a database.

7. The system of claim 5, wherein the data file includes at least one field and the link constraint data includes a uniform resource location (URL) path of the data file, a name of the field, and a name of the component.

8. The system of claim 5, wherein the alert data includes a uniform resource location (URL) path of the data file and a contact information of the controllers.

9. A system, comprising:
a memory; and
one or more processors communicatively coupled to the memory, the one or more processors being configured to perform operations comprising:
prepare a link constraint data that includes information of a data file and a component of an application platform, the component being configured to access the data file, wherein preparing the link constraint data comprises:
scanning the application platform to find the component included in the application platform;
parsing properties of the component to collect the information of the data file;
generating the link constraint data using the information of the data file and component; and
storing the link constraint data in the database;
prepare and store an alert data that includes information of the data file and controllers of the data file, wherein controllers have permission to modify the data file;
responsive to an attempt of a user to modify the data file,
retrieve the information of the component from the link constraint data and the information of the controllers from the alert data;
data file, and
not allow the user to modify the data file based on a determination that the component is configured to access the data file;
send a notice of the attempt to the controllers and the user, the notice including information of potential harm to other components, which are configured to access the data file, if a modification to the data file were not prevented, wherein the notice includes at least one of: information of the user and a list of components that may be affected by the modification to the data file; and
in response to receiving the notice, perform at least one of: prevent the attempt to modify the data file, or assist to complete the modification in an allowed manner.

10. The system of claim 9, the operations further comprising:
scan the application platform to find the data file included in the application platform;
parse properties of the data file to collect the information of the controllers;
generate the alert data using the information of the data file and controllers; and
store the alert data in a database.

11. The system of claim 9, wherein the data file includes at least one field and the link constraint data includes a uniform resource location (URL) path of the data file, a name of the field, and a name of the component.

12. The system of claim 9, wherein the alert data includes a uniform resource location (URL) path of the data file and a contact information of the controllers.

* * * * *